W. H. ATKINSON.
Shaft-Journal and Box therefor.

No. 202,395. Patented April 16, 1878.

WITNESSES
William A. Skinkle
F. Stich

By his Attorneys
Baldwin, Hopkins & Peyton

INVENTOR
W. H. Atkinson

UNITED STATES PATENT OFFICE.

WILLIAM H. ATKINSON, OF NEW YORK, N. Y., ASSIGNOR TO SAMUEL S. WHITE, OF PHILADELPHIA, PA.

IMPROVEMENT IN SHAFT-JOURNALS AND BOXES THEREFOR.

Specification forming part of Letters Patent No. 202,395, dated April 16, 1878; application filed December 21, 1877.

*To all whom it may concern:*

Be it known that I, WILLIAM H. ATKINSON, of New York city, New York, have invented certain new and useful Improvements in Shaft-Journals and Boxes therefor, of which the following is a specification:

My invention relates to that class of journals and boxes or bearings in which provision is made for constantly providing lubricating material to the bearing and journal.

My objects are to equally distribute the oil or lubricant along or throughout the box and journal working therein, and to reduce the frictional surface between the box and journal or the area of parts working in contact.

The subject-matter claimed will hereinafter specifically be designated.

Figure 1:
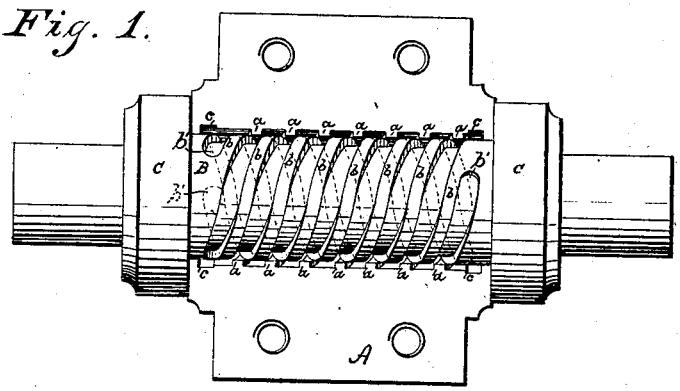
Figure 2:
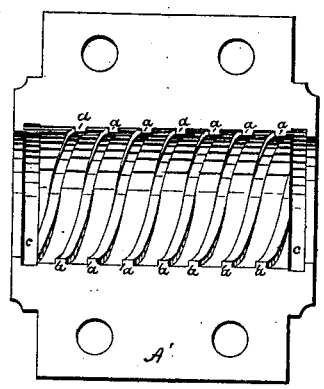
Figure 3:
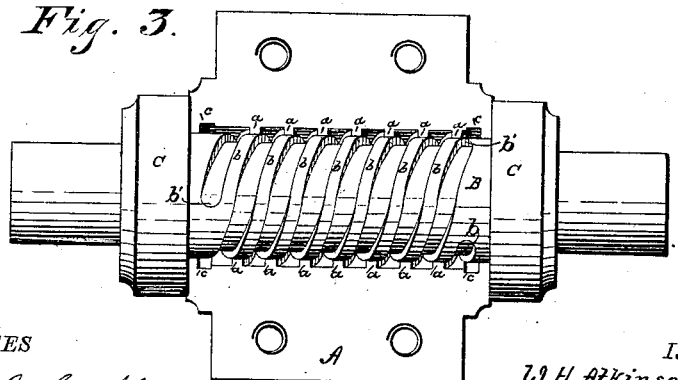

In the accompanying drawings, Figure 1 is a plan view of one half of the box with the shaft-journal resting therein; Fig. 2, a similar view of the other half of the box, showing its internal formation; and Fig. 3, a view similar to Fig. 1, with the shaft turned so as to rest in the box with its bearing-surface in a different position relatively thereto from that shown in Fig. 1.

A journal box or bearing composed of sections or halves A A', having screw-holes and taps for securing them together, or of any other suitable construction, is internally threaded or spirally grooved, as shown, so as to form corresponding projections or lands $a$, extending endwise of the box and continuously around its internal surface, the lands of one section abutting against or joining those of the other when the parts are secured together. In this instance, three separate grooves or threads of like pitch, and running in the same direction, and corresponding lands, are shown as formed in the box.

The number of grooves may be increased or diminished, as desired; but I prefer the number shown, as they give the pitch found most desirable to accomplish a proper distribution of the lubricant upon the shaft-journal, presently described, while giving to the lands or projecting wearing-surfaces the width deemed preferable to insure thorough lubrication, and thus lessen friction.

A shaft-journal, B, with a series of grooves corresponding in number with those of the box, and forming lands $b$ like those, $a$, in the box, but pitched in the opposite direction, as shown, fits in the box, with its lands in contact with those of the box. Collars C C prevent endwise movement of the shaft, as usual.

The ends $b'$ of the grooves preferably terminate abruptly or with upright sides, so as to form receptacles to pick up and carry the lubricant from the bottom or end receptacles of the bearing or box endwise thereof, as the shaft revolves either to the right or to the left.

Annular grooves $c, c$ may be formed in the box at the termination of the lands, to constitute the end receptacles to hold the lubricant.

From the foregoing description it will be seen that the shaft, when revolved in either direction, bears with its series of lands or spiral projections upon the oppositely-pitched lands of the box, the bearing-surfaces in contact constantly changing.

The lubricant, which may be supplied to the box by a suitable opening, is equally distributed along the shaft from end to end of the box, being fed by the screw-like bearing-surfaces of the shaft.

By the shifting of the surfaces in contact, ample opportunity is afforded for the lubricant to reach all parts of the lands of both shaft and box, as every portion of the surface of each is at times exposed.

I claim as of my own invention—

1. The combination of the box, its spiral lands, and the shaft, having corresponding lands of opposite pitch, substantially as set forth.

2. The shaft-journal having a series of grooves terminating abruptly at their ends $b'$, and the corresponding series of lands of like pitch, substantially as and for the purpose set forth.

In testimony whereof I have hereunto subscribed my name.

WILLIAM H. ATKINSON.

Witnesses:
WILLIAM H. RIBLET,
MORTIMER J. ENNIS.